(12) United States Patent
Hara et al.

(10) Patent No.: US 9,165,582 B1
(45) Date of Patent: Oct. 20, 2015

(54) THERMAL ASSISTED MAGNETIC RECORDING HEAD UTILIZING UNCOUPLED LIGHT

(71) Applicant: TDK Corporation, Tokyo (JP)

(72) Inventors: Shinji Hara, Tokyo (JP); Eiji Komura, Tokyo (JP); Norikazu Ota, Tokyo (JP); Daisuke Miyauchi, Tokyo (JP); Tetsuya Roppongi, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 27 days.

(21) Appl. No.: 14/250,522

(22) Filed: Apr. 11, 2014

(51) Int. Cl.
| | |
|---|---|
| G11B 11/00 | (2006.01) |
| G11B 5/48 | (2006.01) |
| G11B 5/31 | (2006.01) |
| G11B 5/60 | (2006.01) |
| G11B 13/08 | (2006.01) |
| G11B 5/00 | (2006.01) |
| G11B 7/1387 | (2012.01) |

(52) U.S. Cl.
CPC .............. *G11B 5/4866* (2013.01); *G11B 5/314* (2013.01); *G11B 5/3163* (2013.01); *G11B 5/6082* (2013.01); *G11B 5/6088* (2013.01); *G11B 13/08* (2013.01); *G11B 7/1387* (2013.01); *G11B 2005/0021* (2013.01)

(58) Field of Classification Search
CPC ..................... G11B 5/4866; G11B 2005/0021; G11B 5/314; G11B 5/6088; G11B 2005/001; G11B 7/1387; G11B 5/3166; G11B 13/045; G11B 11/10554; G11B 11/1058; G11B 5/3133; G11B 5/3163; G11B 13/08; G11B 5/6082

USPC .......... 369/13.33, 13.32, 13.24, 13.03, 13.01, 369/13.35, 112.27, 13.13
See application file for complete search history.

(56) References Cited

U.S. PATENT DOCUMENTS

| 8,000,178 B2* | 8/2011 | Shimazawa et al. ........ 369/13.33 |
| 2010/0103553 A1 | 4/2010 | Shimazawa et al. | |

FOREIGN PATENT DOCUMENTS

| JP | 10-162444 A | 6/1998 |
| JP | 2001-255254 A | 9/2001 |
| JP | 2004-158067 A | 6/2004 |

* cited by examiner

*Primary Examiner* — Ali Neyzari
(74) *Attorney, Agent, or Firm* — Posz Law Group, PLC

(57) ABSTRACT

A thermal assisted magnetic recording head has a magnetic head slider having an air bearing surface that is opposite to a magnetic recording medium, a core that can propagate laser light as propagating light, a plasmon generator that includes a generator front end surface facing the air bearing surface, and a main pole facing the air bearing surface, and a laser light generator that supplies the laser light to the core. The plasmon generator generates near-field light (NF light) at the generator front end surface to heat the magnetic recording medium. The main pole includes a main pole end surface that faces the air bearing surface and that is positioned in the vicinity of the generator front end surface, and emits a magnetic flux to the magnetic recording medium from the main pole end surface. At least a portion of the laser light that is not coupled with the plasmon generator thermally deforms the air bearing surface so that a part of the air bearing surface positioned closer to the leading side than the generator front end surface and the main pole end surface in the down track direction protrudes toward the magnetic recording medium.

12 Claims, 10 Drawing Sheets

THERMAL ASSISTED MAGNETIC RECORDING HEAD UTILIZING UNCOUPLED LIGHT

BACKGROUND OF THE INVENTION

1. Field of the Invention

The present invention relates to a thermal assisted magnetic recording head, and it particularly relates to a thermal assisted magnetic recording head using a plasmon generator.

2. Description of the Related Art

Recently, in a magnetic recording device typified by a magnetic disk device, in association with high recording density, there is a demand for improvement in performance of thin film magnetic heads and magnetic recording media. As the thin film magnetic head, composite-type thin film magnetic heads are widely used in which a reproducing head having a magneto-resistive effect element (MR element) for reading, and a recording head having an induction-type electromagnetic transducer element for writing, are laminated on a substrate.

The magnetic recording medium is a discontinuous medium where magnetic grains are aggregated, and each magnetic grain has a single magnetic domain structure. Each recording bit on the magnetic recording medium is configured by a plurality of magnetic grains. In order to increase the recording density, asperities at the border between adjacent recording bits need to be decreased by decreasing the size of the magnetic grains. On the other hand, decreasing the size of the magnetic grains, i.e., decreasing in the volume of the magnetic grains, results in a decrease in the thermal stability of magnetization in the magnetic grains. In order to resolve this problem, it is effective to increase the anisotropic energy of the magnetic grains. However, the increased anisotropic energy of the magnetic grains enhances the coercive force of the magnetic recording medium, making it difficult to record the information by an existing magnetic head.

As a method for resolving this problem, so-called thermal assisted magnetic recording is proposed. In this method, a magnetic recording medium with a high coercive force can be used. At the time of recording information, the simultaneous addition of a magnetic field and heat to a portion of the recording medium where the information will be recorded increases the temperature of that portion. This results in information being recorded by the magnetic field at the portion where the coercive force is decreased. Hereafter, the magnetic head used for thermal assisted magnetic recording is referred to as a thermal assisted magnetic recording head (TAMR head).

In thermal assisted magnetic recording, a laser light source is commonly used for heating a magnetic recording medium. As heating methods, a method to heat a magnetic recording medium with laser light (direct heating) and a method to convert the laser light into near-field light (NF light) and heat a magnetic recording medium (NF light heating) are known.

As an example of direct heating, in JP 1110-162444, a head using a solid immersion lens for an optical magnetic disk is disclosed. The head forms a super fine optical beam spot on an optical magnetic disk, and records a signal in a super fine magnetic domain.

As an example of NF light heating, in JP 2001-255254, an NF light probe used for optical recording, i.e., a so-called plasmon antenna is disclosed. The NF light probe is configured with a metallic scatterer in the shape of a conical body or film-like triangle formed on a substrate, and a film, such as a dielectric body formed around the scatterer, and generates NF light from plasmon excited by light. The NF light is a type of so-called electromagnetic field formed around the periphery of a material, and diffraction limitations due to the wavelength of the light can be ignored. By irradiating a microstructure with light having the same wavelength, NF light depending upon the scale of the microstructure is formed, and it is even possible to focus light onto a very small domain on the order of tens of nm.

In JP 2004-158067, an NF light probe used for a single magnetic pole for perpendicular magnetic recording head is disclosed. The NF light probe is a scatterer made of gold, and is formed to be perpendicular to the magnetic recording medium contacting the main pole.

One of the problems of the TAMR head is the reliability of the plasmon antenna against heat. As described in JP 2001-255254 and JP 2004-158067, when light is directly irradiated to the plasmon antenna, the temperature of the plasmon antenna drastically rises, and the thermal reliability decreases. In US2010/0103553, instead of directly irradiating the plasmon antenna with light propagating through the core, a technology is disclosed in which the surface plasmon is excited at a plasmon generator adjacent to the core via a buffer layer. The propagating light is coupled with a plasmon generator in a surface plasmon polariton mode, and excites the surface plasmon at the plasmon generator. Specifically, evanescent light which penetrates the buffer layer is generated at an interface by the total reflection of the light propagating through the core at the interface of the core and the buffer layer. Collective vibration of electric charges in the plasmon generator, i.e., surface plasmon, is coupled with the evanescent light, and the surface plasmon is excited at the plasmon generator. The surface plasmon excited at the plasmon generator propagates to the generator front end surface via a propagation edge, and generates NF light at the generator front end surface. According to this technology, because light that propagates through the core is not directly irradiated to the plasmon generator, it is possible to prevent an excessive temperature increase at the plasmon generator. Such a plasmon generator is referred to as a surface evanescent light coupling type NF light generator.

However, in current TAMR, deterioration of recording characteristics (such as the S/N ratio) in association with continuous recording has been confirmed. As the main factor, agglomeration of the generator front end surface of the plasmon generator is recognized. The agglomeration is a phenomenon where metal atoms gather, and it occurs as a result of diffusion and movement of the metal atoms using heat and stress as the driving force. Asperities exist on an air bearing surface of the magnetic head slider and a surface of the magnetic recording medium, and the generator front end surface of the plasmon generator may make contact with the magnetic recording medium during the operation of the magnetic recording device. The temperature increase and stress increase due to the impact occurring at this time cause the agglomeration. In general, because metal formed by sputtering or a plating method has low density, the density is gradually increased due to heat or stress, and the volume is easily reduced. Since the plasmon generator is normally formed by sputtering, agglomeration and a recess from the air bearing surface in association with the agglomeration easily occur. As a result, the distance between the plasmon generator and the magnetic recording medium is increased, and the capability to heat the magnetic recording medium decreases over time, causing the deterioration of the S/N ratio. Therefore, it is desirable to suppress the agglomeration of the plasmon generator in order to secure the reliability of the TAMR head.

The object of the present invention is to provide a TAMR head with high reliability where the agglomeration of the generator front end surface of the plasmon generator rarely occurs, and the manufacturing method thereof.

SUMMARY OF THE INVENTION

The thermal assisted magnetic recording head of the present invention has a magnetic head slider having an air bearing surface that is opposite to a magnetic recording medium, a core that can propagate laser light as propagating light, a plasmon generator that includes a generator front end surface facing the air bearing surface, and a main pole facing the air bearing surface, and a laser light generator that supplies the laser light to the core. The plasmon generator is opposite to a part of the core and extends to the generator front end surface, is coupled with a portion of the propagating light that propagates through the core in the surface plasmon mode and generates surface plasmon, propagates the surface plasmon to the generator front end surface, and generates near-field light (NF light) at the generator front end surface to heat the magnetic recording medium. The main pole includes a main pole end surface that faces the air bearing surface and that is positioned in the vicinity of the generator front end surface, and emits a magnetic flux to the magnetic recording medium from the main pole end surface. At least a portion of the laser light that is not coupled with the plasmon generator thermally deforms the air bearing surface so that a part of the air bearing surface positioned closer to the leading side than the generator front end surface and the main pole end surface in the down track direction protrudes toward the magnetic recording medium.

The magnetic head slider approaches a predetermined position of the magnetic recording medium from the leading side, and subsequently, the trailing side approaches. According to the present invention, at least a portion of laser light that is not coupled with the plasmon generator thermally deforms the air bearing surface. At this time, at least a part of the air bearing surface positioned closer to the leading side than the generator front end surface and the main pole end surface in the down track direction protrudes toward the magnetic recording medium. Consequently, the convex part of the air bearing surface makes contact with this protrusion part first and deforms, and the height of the convex part is reduced. After that, the convex part of the air bearing surface approaches the generator front end surface of the plasmon generator; however, since the height of the convex part is reduced, a collision can be avoided, or even if a collision occurs, the impact force decreases. Therefore, the possibility that the heat and mechanical stress are applied to the generator front end surface of the plasmon generator due to contact with the magnetic recording medium is reduced, and the agglomeration of the generator front end surface is suppressed.

Another embodiment of the present invention provides a manufacturing method for a TAMR head mentioned above. The present manufacturing method targets a predetermined positional relationship between a laser beam generator and a magnetic head slider, and includes affixing the laser diode unit including the laser light generator to the magnetic head slider. In the positional relationship described above, a portion of the laser light is coupled with the core, and the emission center of the laser light generator is shifted toward the leading side in the down track direction from the position with the highest coupling efficiency to the core.

The above mentioned or other objective, characteristics and advantages of the present invention will become clear from the following explanation by referring to the attached drawings where the present invention is exemplified.

DETAILED DESCRIPTION OF THE INVENTION

Figure 1:
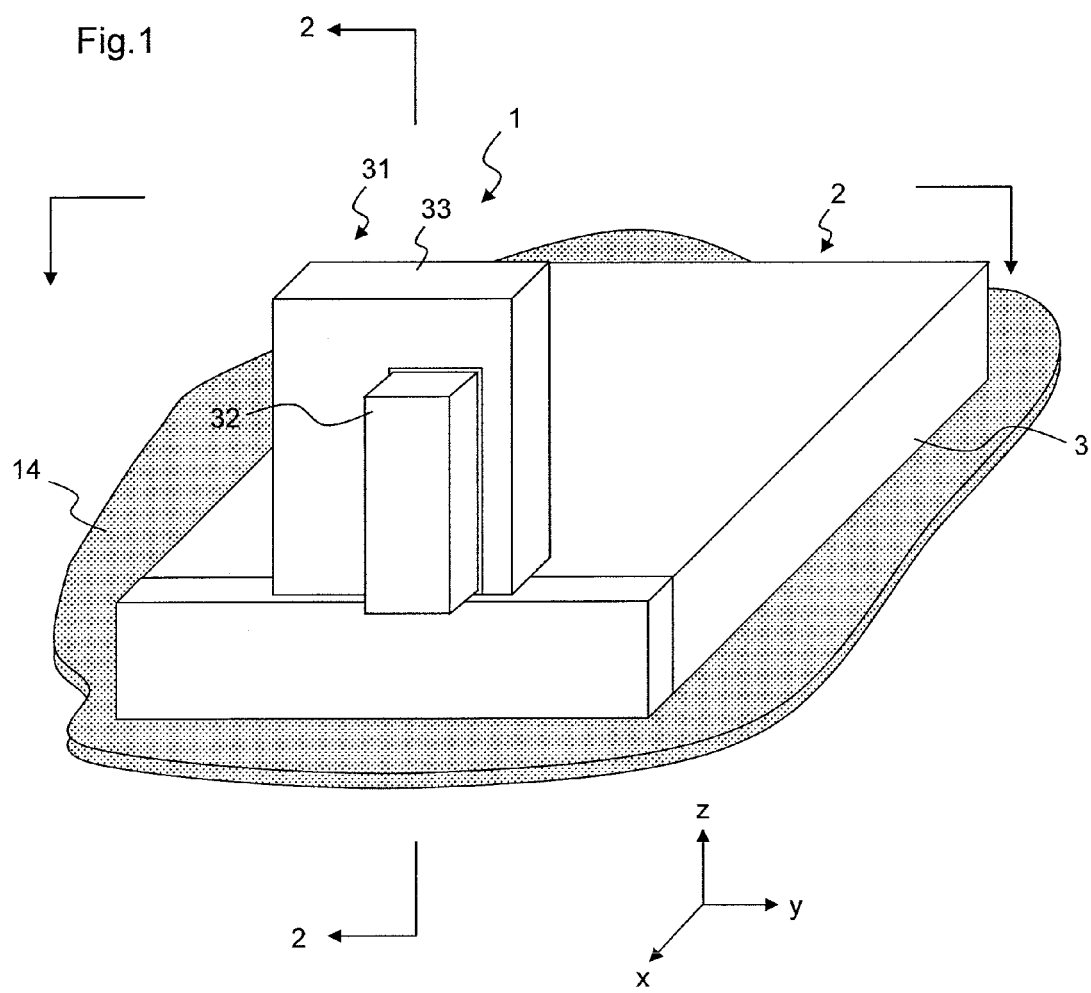
FIG. 1 is an overall perspective view of a thermal assisted magnetic recording head.
Figure 2:
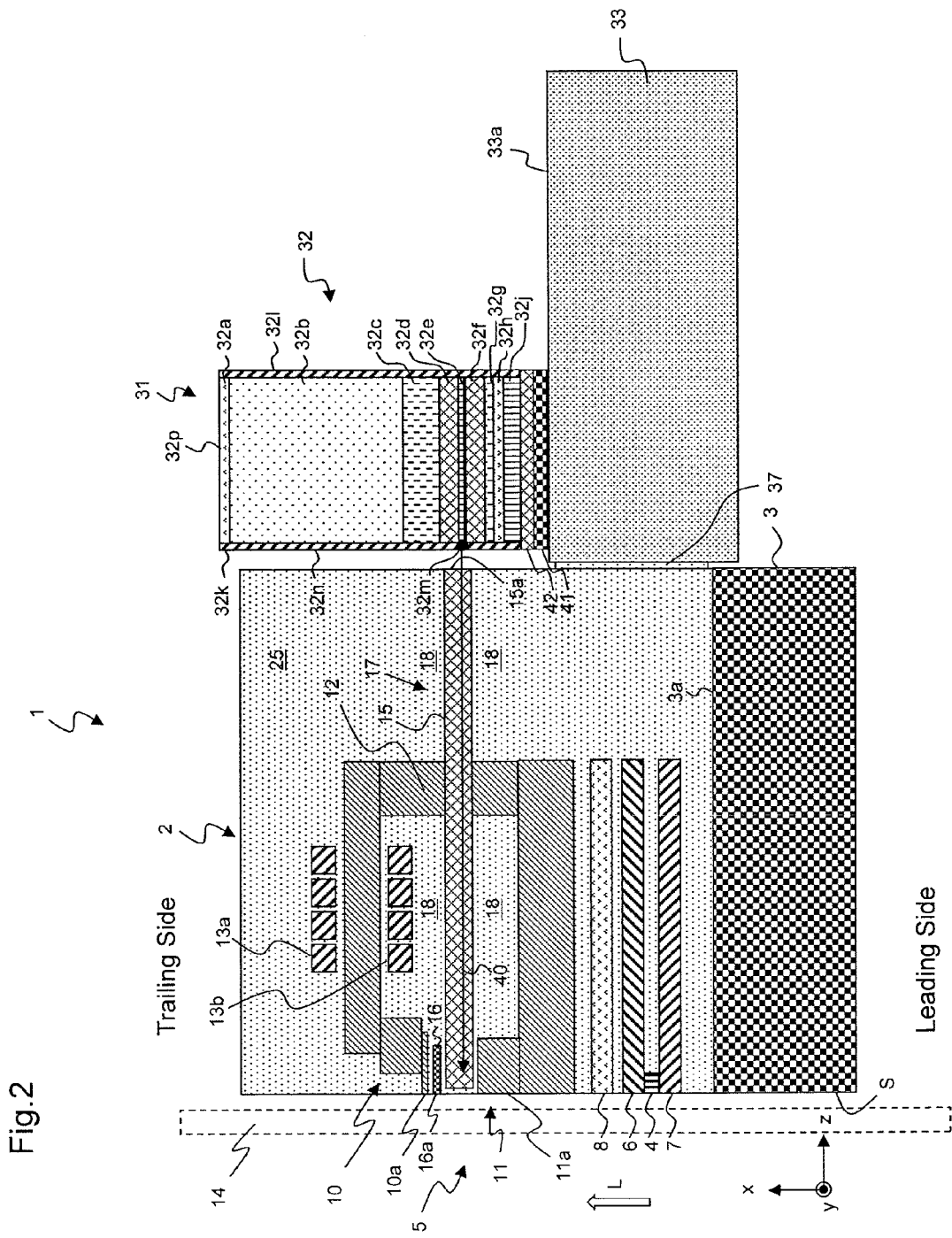
FIG. 2 is a conceptual cross-sectional view of a thermal assisted magnetic recording head relating to one embodiment of the present invention.
Figure 3:
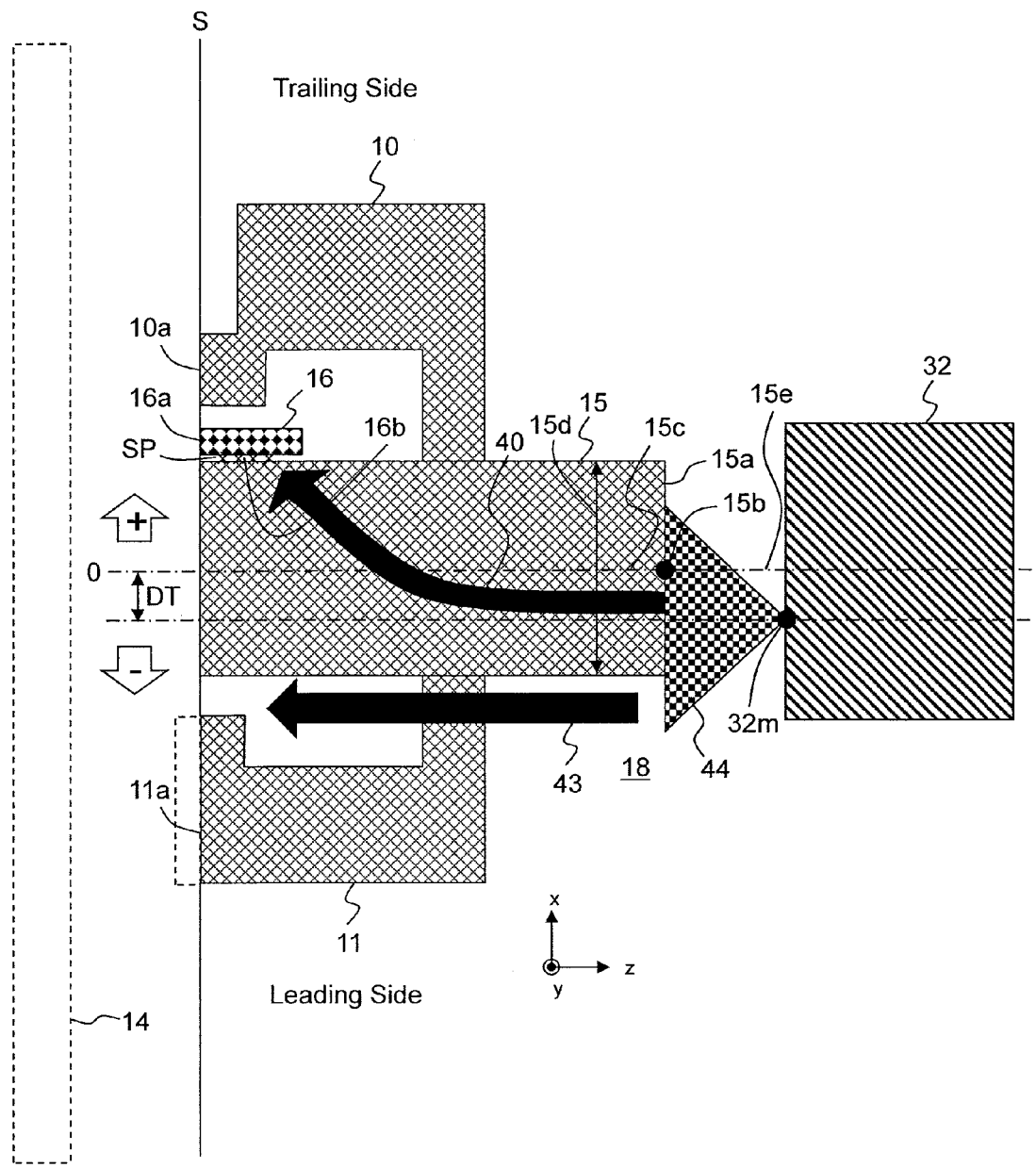
FIG. 3 is a schematic cross-sectional view of a plasmon generator, a core, a main pole and a leading shield.

First, a configuration of a thermal assisted magnetic recording head relating to one embodiment of the present invention is explained. FIG. 1 is an overall perspective view of the TAMR head. FIG. 2 is an overall cross-sectional view of the TAMR head cut along the line 2-2 of FIG. 1. FIG. 3 is a cross-sectional view cut along the line 2-2 of FIG. 1, schematically showing the plasmon generator, the core, the main pole and the leading shield.

In the specification, the x direction refers to the down track direction (recording medium circumferential direction) or a direction that is orthogonal to an integrated surface $3a$ of a substrate 3 where a magneto resistive (MR) element and a magnetic recording element are formed; the y direction refers to the cross track direction (recording medium radius direction) of the magnetic recording medium 14; and the z direction refers to the direction that is orthogonal to the air bearing surface of a magnetic head slider. The x direction corresponds to the film formation direction L in the wafer process, the relative movement direction of the magnetic head slider with respect to the track circumferential direction of the magnetic recording medium 14, or a tangential direction of a track at a position of the thermal assisted magnetic recording head on the magnetic recording medium 14. The x direction, the y direction and the z direction are orthogonal to each other.

"Upward" and "downward" correspond to a direction away from a substrate and a direction approaching the substrate relative to the x direction, respectively. Instead of "upward," "trailing side" may be used, and instead of "downward," "leading side" may be used.

A magnetic head 1 has a magnetic head slider 2, and a laser diode unit 31 that is affixed to the magnetic head slider 2 and emits laser light.

The magnetic head slider 2 has a substantially hexahedral shape, one surface of which configures an air bearing surface S opposite to the magnetic recording medium 14. The magnetic head slider 2 has an MR element 4, a magnetic recording element 5, a waveguide 17 that includes a core 15 that can propagate laser light emitted from the laser diode unit 31 as propagating light, and a plasmon generator 16 that generates NF light at the air bearing surface S from the propagating light. These elements are formed on a substrate 3 made of AlTiC ($Al_2O_3$—TiC).

The magnetic recording element 5 has a main pole 10 for perpendicular magnetic recording facing the air bearing surface S. The main pole 10 is provided adjacent to the plasmon generator 16. A main pole end surface 10a, which is an end part of the main pole 10, is positioned on the air bearing surface S, and generates a magnetic field for recording at the air bearing surface S. A leading shield 11 is provided at the leading side of the main pole 10 in the down track direction x. The leading shield 11 is magnetically linked with the main pole 10 via a contact part 12, and configures an integrated magnetic circuit with the main pole 10. The main shield 11 has a shield end surface 11a facing the air bearing surface S. Coils 13a and 13b are wound around the main pole 10 to set the contact part 12 as the center. The main pole 10, the leading shield 11 and the contact part 12 are formed with an alloy made of any two or three of Ni, Fe and Co. An overcoat layer 25 made of $Al_2O_3$ is provided upward in the x direction of the magnetic recording element 5.

Magnetic flux generated inside the main pole 10 is emitted from the main pole end surface 10a toward the magnetic recording medium 14 as magnetic flux for writing. The magnetic flux emitted from the main pole end surface 10a enters into the magnetic recording medium 14 and magnetizes each recording bit in the perpendicular direction z. The magnetic flux changes its magnetic path to the in-plane direction (x direction), again changes its orientation to the perpendicular direction (z direction) in the vicinity of the leading shield 11, and is then absorbed by the leading shield 11 from the shield end surface 11a.

The magnetic head slider 2 has a waveguide 17 that can propagate laser light. The waveguide 17 includes the core 15 extending in the z direction and a cladding 18 covering the core 15. The core 15 propagates laser light generated at the laser diode unit 31 in the z direction as propagating light 40. The core 15 extends from the end part 15a (incident end surface of laser light) opposite to the laser diode unit 31 of the magnetic head slider 2 to the air bearing surface S or its vicinity. The core 15 may terminate before the air bearing surface S or may extend to the air bearing surface S. The cross section of the core 15 that is orthogonal to the propagation direction (z direction) of the propagating light 40 is rectangular, and its width (dimension in the y direction) is greater than its thickness (dimension in the x direction). The core 15 may be formed with, for example, TaOx. TaOx means tantalum oxide with any composition, of which $Ta_2O_5$, TaO, $TaO_2$ and the like are typical, but is not limited to these. The core 15 is covered with the cladding 18 having a smaller refractive index than the core 15. The cladding 18 can be formed with a dielectric body, for example, $SiO_2$, $Al_2O_3$ and the like.

The magnetic head slider 2 has an MR element 4, the front end part of which is positioned on the air bearing surface S, and the upper-side shield layer 6 and the lower-side shield layer 7 that are respectively provided at both sides of the MR element 4 in the x direction. The MR element 4 may be any of a Current-in-Plane (CIP)-Gigantic-Magneto-Resistive (GMR) element where its sense current flows in they direction, a Current-Perpendicular-to-Plane (CPP)-GMR element where its sense current flows in the x direction or a Tunneling-Magneto-Resistive (TMR) element where its sense current flows in the x direction, and that utilizes a tunnel effect. When the MR element 4 is the CPP-GMR element or the TMR element, the upper-side shield layer 6 and the lower-side shield layer 7 are also utilized as electrodes that supply a sense current. A magnetic shield layer 8 is provided between the MR element 4 and the magnetic recording element 5.

The magnetic head slider 2 has a plasmon generator 16 that generates NF light at the air bearing surface S from the propagating light 40. The plasmon generator 16 includes a generator front end surface 16a facing the air bearing surface S, and extends to the generator front end surface 16a opposite to a part of the core 15 along the core 15. The main pole end surface 10a is positioned in the vicinity of the generator front end surface 16a. The plasmon generator 16 is coupled with a portion of the propagating light 40 that propagates through the core 15 in the surface plasmon mode and generates surface plasmon, propagates the surface plasmon to the generator end surface 16a, generates NF light at the generator front end surface 16a and irradiates the NF light to the magnetic recording medium 14. With this, the plasmon generator 16 heats the portion of the magnetic recording medium 14 where information is recorded. The plasmon generator 16 is formed with Au, Ag, Cu, Al, Pd, Ru, Pt, Rh, Ir or an alloy that consists primarily of these metals.

In the present embodiment, the plasmon generator 16 is a roughly quadrangular prism shaped metallic strip having a rectangular cross section. Therefore, the generator front end surface 16a is rectangular; however, it may also be square, triangular or the like. Out of four sides of the plasmon generator 16 extending in the z direction, a surface opposite to the core 15 configures a propagation surface 16b. The propagation surface 16b is coupled with the propagating light 40 that propagates through the core 15 in the surface plasmon mode, and generates surface plasmon SP. The propagation surface 16b propagates the generated surface plasmon SP to the generator front end surface 16a of the plasmon generator 16, and generates NF light at the generator front end surface 16a.

The laser diode unit 31 is positioned opposite to a surface on the opposite side of the air bearing surface S of the magnetic head slider 2. The laser diode unit 31 emits laser light toward the core 15 of the waveguide 17 of the magnetic head slider 2 in the direction z that is perpendicular to the air bearing surface S. The laser diode unit 31 is soldered to the magnetic head slider 2 by a bonding layer 37.

The laser diode unit 31 includes a laser diode 32, which is a laser light generator, and a sub mount 33 where the laser diode 32 is mounted. The laser diode 32 supplies laser light to the core 15. The sub mount 33 is made of a Si substrate and the like. The laser diode 32 is mounted onto the mounting surface 33a of the sub mount 33. Specifically, a first electrode (p electrode) 32j of the laser diode 32 is affixed to a pad 41 that is provided at the mounting surface 33a of the sub mount 33 with a solder material 42.

The laser diode 32 is an edge emitting type, and one that is normally used for communication, such as an InP-system, a GaAs-system or a GaN-system, for optical system disk storage or for material analysis. The wavelength of the laser light to be emitted is not particularly limited, but a wavelength in the range of 375 nm to 1.7 μm can be utilized, and in particular, a wavelength of approximately 650 to 900 nm is preferably used.

The laser diode 32 is not limited to the following configuration, but in one example, it has a configuration in which an n electrode 32a configuring a second electrode, an n-GaAs substrate 32b, an n-InGaAlP cladding layer 32c, a first InGaAlP guide layer 32d, an active layer 32e made of a multiple quantum well (InGaP/InGaAlP), a second InGaAlP guide layer 32f, a p-InGaAlP cladding layer 32g, a p electrode under layer 32h and the p electrode 32j configuring the first electrode are sequentially laminated. In front and behind a cleavage surface of the laser diode 32, reflection layers 32k and 32l are formed for exciting the oscillation by total reflection. The surface of the reflection layer 32k, i.e. a surface opposite to the magnetic head slider 2 of the laser diode 32, configures a light-emitting surface 32n of the laser diode 32. An emission center 32m exists at the position of the active layer 32e of the reflection layer 32k. The n electrode 32a and the p electrode 32j can be formed with Au or an Au alloy with a thickness of approximately 0.1 μm. When a hard disk device is operated, electricity is supplied to the laser diode 32 from the power source inside the hard disk device via the first electrode 32j and the second electrode 32a.

With reference to FIG. 3, in the present embodiment, the emission center 32m of the laser diode 32 is shifted toward the leading side in the down track direction x from the center position 15b of the down track direction of the core 15. The magnitude of the shift, i.e., the offset DT toward the down track direction x, is defined as shown in FIG. 3. When the offset DT=0, a laser light 44 is coupled with the core 15 at the highest coupling efficiency. In other words, when the offset DT=0, the laser light is introduced into the core 15 with the highest rate of optical energy of the laser light 44 emitted from the laser diode 32. In the position where the offset DT=0, the center of the optical distribution of the laser light 44 emitted from the laser diode 32 is normally on an extended line 15e of a central axis 15c of the core 15. In the specification, when the emission center 32m of the laser diode 32 is shifted toward the trailing side (i.e., the main pole 10 side) from the standard position where the offset DT=0, the offset DT is regarded as positive, and when it is shifted toward the leading side (i.e. leading shield 11 side), the offset DT is regarded as negative. FIG. 3 shows the negative offset DT. The magnitude of the offset DT, i.e. the offset distance DT between the emission center 32m of the laser diode 32 and the central axis 15c of the core in the down track direction, is desirably within the range of 0 to 37.5% (excluding 0%) of a down track-direction dimension 15d of the core 15 (thickness of the core 15 in the x direction).

As schematically shown in FIG. 3, the laser light 44 emitted from the laser diode 32 diffuses from the emission center 32m and propagates in the air. A portion of the laser light 44 is irradiated toward the incident end surface 15a of the core 15, is coupled with the core 15, propagates inside the core 15 as the propagating light 40, and generates plasmon at the plasmon generator 16 (furthermore, the propagating light 40 in the figure is represented by a curved line for convenience in order to express coupling with the plasmon generator 16). Residual laser light 43 is primarily irradiated to the cladding 18 positioned on the leading side of the core 15, and propagates inside the cladding 18 without being coupled with the core 15 as propagating light. In the specification, laser light that is not coupled with the core 15 as propagating light or light that leaks to the cladding 18 without being coupled with the core 15 is referred to as uncoupled light.

Figure 4A:
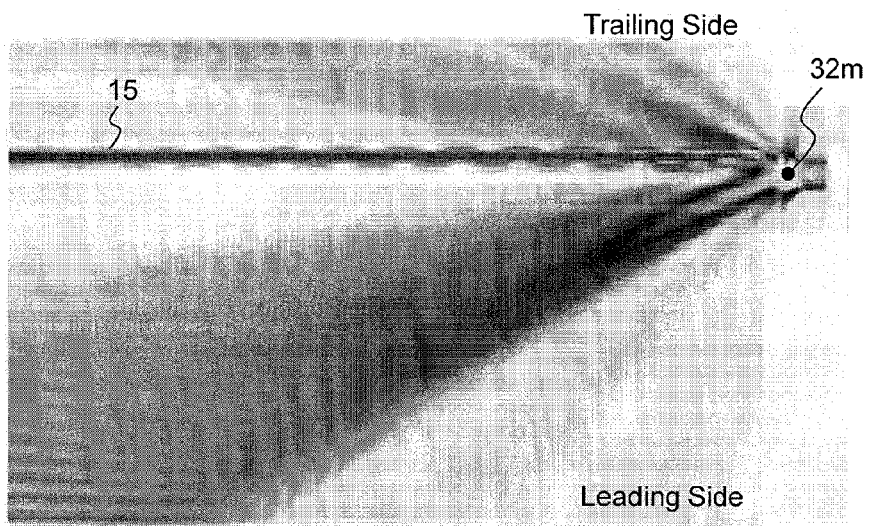
FIGS. 4A to 4C are views showing a relationship between an offset of a laser diode and a distribution of uncoupled light, respectively.
Figure 4B:
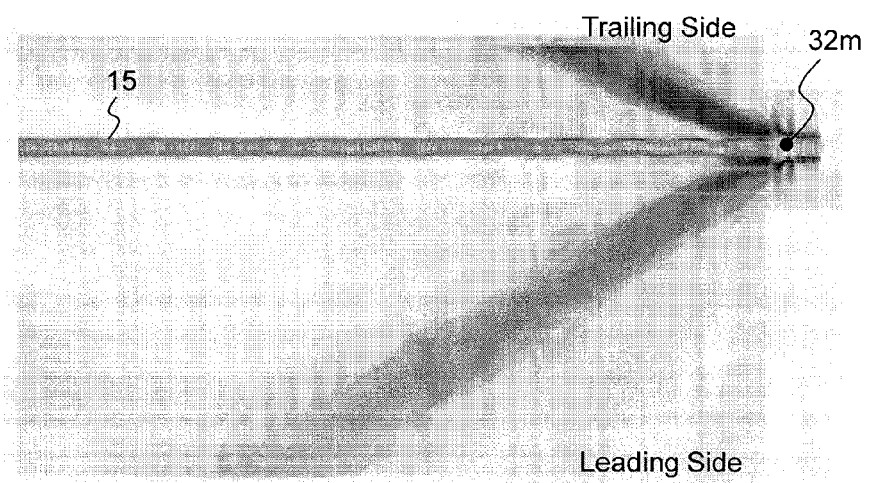
Figure 4C:
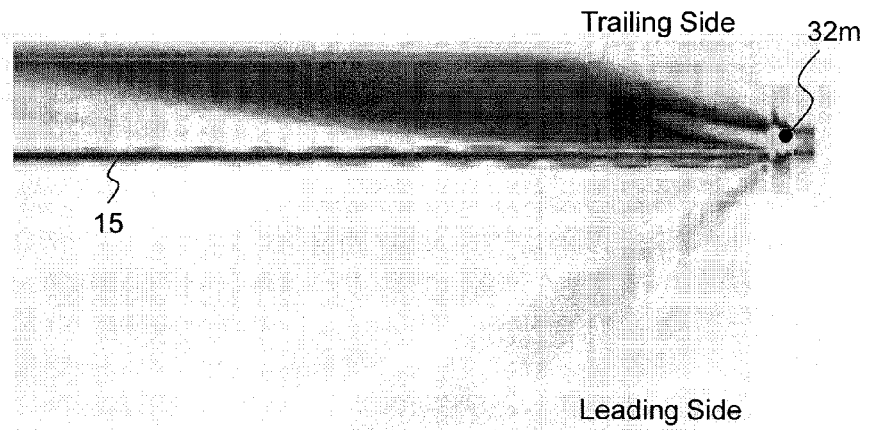

FIGS. 4A to 4C show intensity distributions of the uncoupled light when the offset DT is negative (−0.6 μm), 0 and positive (+0.6 μm), respectively. The darker portion indicates higher light intensity, and the lighter portion indicates lower light intensity. In FIG. 4A, since the irradiation range of the laser light is shifted toward the leading side, the higher light intensity appears on the lower side (leading side) of the core 15. In FIG. 4B, since the irradiation range of the laser light is symmetrical relative to the center of the core 15, the higher light intensity appears almost symmetrically on the lower side (leading side) and the upper side (trailing side) of the core 15. However, since most of the laser light is coupled with the core 15, the intensity of the uncoupled light is small. In FIG. 4C, since the irradiation range of the laser light is shifted toward the trailing side, the higher light intensity appears on the upper side (trailing side) of the core 15. In the present embodiment, since the emission center 32m of the laser diode 32 is positioned on the leading side from the central axis of the core 15, the uncoupled light is unevenly distributed on the leading side of the core 15. In other words, the present embodiment produces the state shown in FIG. 4A or a similar state.

The uncoupled light 43 propagating inside the cladding 18 reaches the vicinity of the leading shield 11 and heats the leading shield 11. Consequently, the leading shield 11 protrudes toward the magnetic recording medium 14 due to thermal expansion (shown in FIG. 3 with a broken line). A structure other than the leading shield 11, for example, an $Al_2O_3$ layer covering the periphery of the leading shield 11, is also heated, and protrudes toward the magnetic recording medium 14 due to thermal expansion. Therefore, at least a portion of the uncoupled light 43 thermally deforms the air bearing surface S so that a part of the air bearing surface positioned closer to the leading side than the generator front end surface 16a and the main pole end surface 10a in the down track direction protrudes toward the magnetic recording medium 14. Preferably, a part of the air bearing surface S (typically, the shield end surface 11a of the leading shield 11) positioned on the leading side protrudes more toward the magnetic recording medium 14 than the generator front end surface 16a of the plasmon generator. 16 and the main pole end surface 10a of the main pole 10.

Figure 5A:
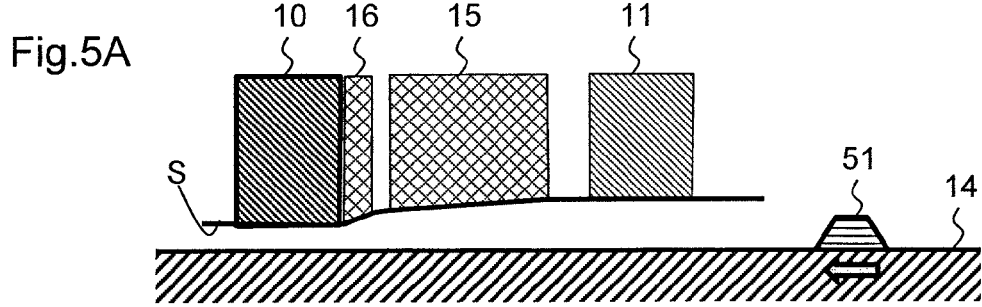
FIGS. 5A to 5B are schematic views showing the problem when the plasmon generator protrudes more than the leading shield, respectively.
Figure 5B:
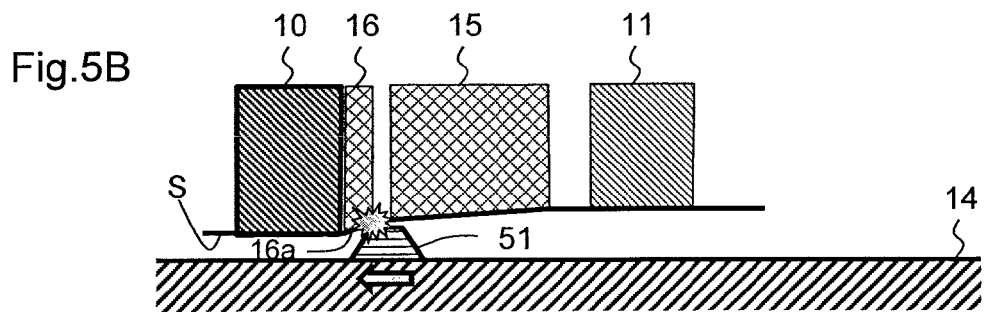

For the reasons below, it is advantageous that the leading shield 11 protrudes more toward the magnetic recording medium 14 than the plasmon generator 16 and the main pole 10. Asperities exist on the magnetic recording medium 14 at a certain probability, and a convex part collides with the air bearding surface S of the magnetic head slider 2 with a certain probability. FIGS. 5A and 5B schematically show the state in which a convex part 51 on the rotating magnetic recording medium 14 approaches the magnetic head and collides with the magnetic head. FIGS. 5A and 5B show the case when the offset is positive, and the main pole 10 and the plasmon generator 16 protrude more toward the magnetic recording medium 14 than the leading shield 11. The plasmon generator 16 accompanies (is pulled by) the main pole 10, and protrudes toward the magnetic recording medium 14 (FIG. 5A).

When the convex part 51 is within a certain height range, the convex part 51 approaches the plasmon generator 16 without colliding with the leading shield 11. Consequently, the convex part 51 directly collides against the plasmon generator 16 (FIG. 5B). At this time, great stress and high temperature are instantaneously generated, and the plasmon generator is deformed. This deformation causes the agglomeration on the generator front end surface 16a of the plasmon generator 16. In actuality, in a longevity test described later, examining a magnetic head with a deteriorated S/N ratio, markings indicating physical collisions were confirmed. Even when the convex part 51 does not collide with the plasmon generator 16, but collides with the main pole 10, stress and high temperature occurring at the main pole 10 propagate to the plasmon generator 16, and the plasmon generator 16 receives a similar impact when the convex part 51 directly collides with the plasmon generator 16. Therefore, it is also desirable to avoid a mechanical collision between the main pole 10 and the convex part 51.

Figure 6A:
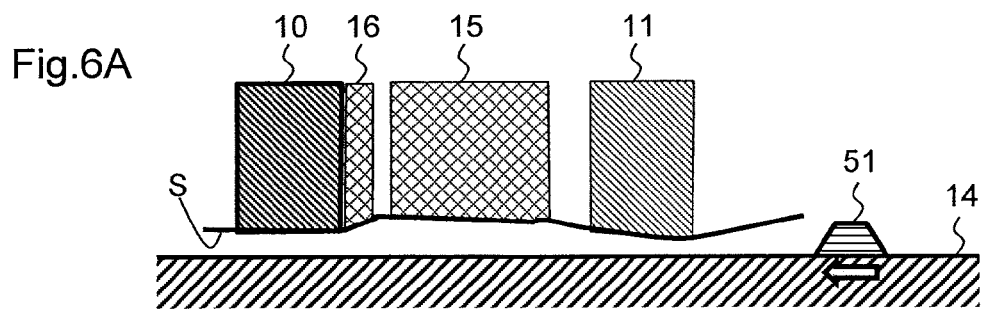
FIGS. 6A to 6C are schematic views showing the effect when the leading shield protrudes more than the plasmon generator, respectively.
Figure 6B:
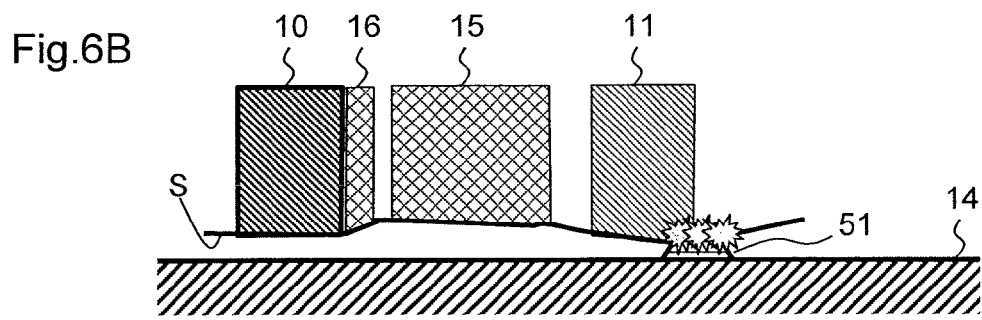
Figure 6C:
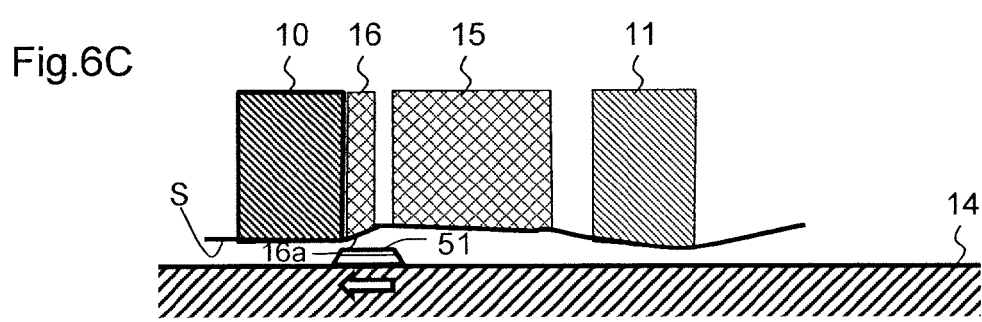

FIGS. 6A to 6C show the case when the offset is negative, and the leading shield 11 protrudes more than the main pole 10 and the plasmon generator 16. The convex part 51 collides with the leading shield 11, is deformed on that occasion, and its height becomes shorter. In other words, the leading shield 11 becomes a sacrificial part and collides with the convex part 51, and the magnetic recording medium 14 is substantially planarized (FIG. 6B). Then, the convex part 51 approaches the plasmon generator 16, but passes through the magnetic head without colliding with the plasmon generator 16 and the main pole 10 (FIG. 6C). Because the leading shield 11 collides with the convex part 51 first, direct physical contact between the convex part 51 and the plasmon generator 16 is avoided. Consequently, it is difficult to generate agglomeration on the generator front end surface 16*a* of the plasmon generator 16, and thermal reliability of the plasmon generator 16 is enhanced.

It is effective that the leading shield 11 protrudes more than the main pole 10 and the plasmon generator 16 even in the 'touchdown' process to determine a reference point for determination of clearance between the head and the magnetic recording medium. The touchdown process is conducted during the operation of the magnetic recording device in order to maintain the clearance within the optimum range. In this process, by activating a flexure, the magnetic head is moved up and down with respect to the magnetic recording medium 14. During this process, the magnetic head collides with the magnetic recording medium 14. In order to accurately determine the reference point, it is necessary to accurately detect the collision. In general, the leading shield 11 has a greater area to make contact with the magnetic recording medium 14 than the main pole 10 and the plasmon generator 16, so a signal in association with such contact is easily detected.

Figure 7A:
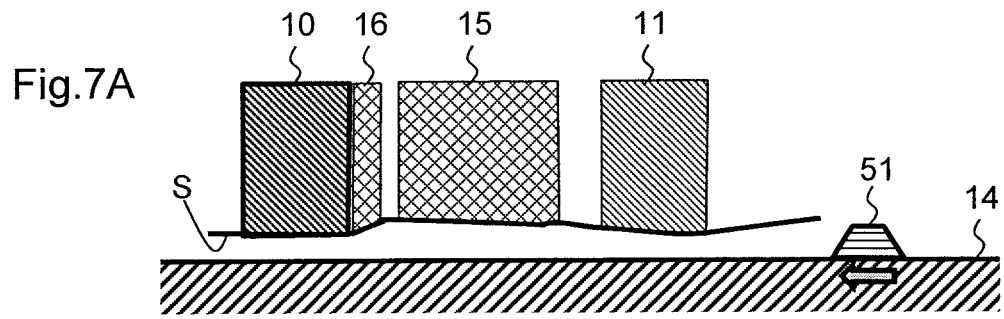
FIGS. 7A to 7C are schematic views showing the effect when the plasmon generator protrudes slightly more than the leading shield, respectively.
Figure 7B:
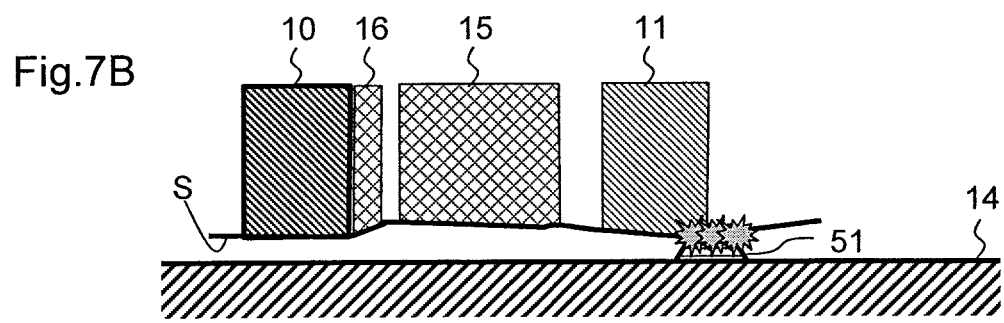
Figure 7C:
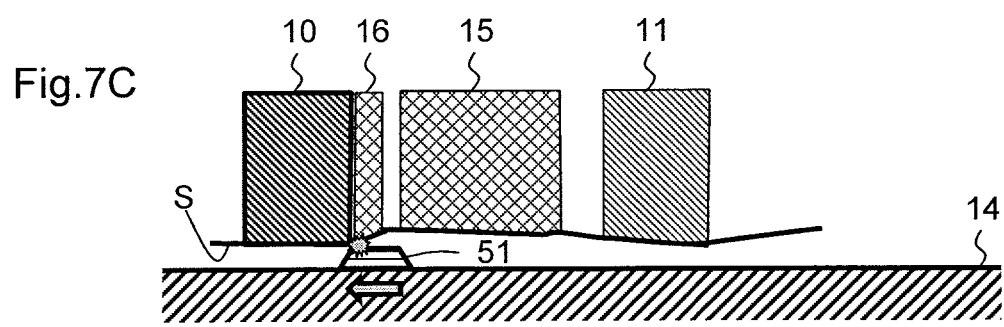

FIGS. 7A to 7C show cases when the offset is positive but the offset value is small, and the main pole 10 and the plasmon generator 16 protrude slightly more than the leading shield 11 (FIG. 7A). As similar to FIG. 6B, the convex part 51 collides with the leading shield 11, and is deformed on that occasion, and the height becomes shorter. In other words, the leading shield 11 becomes a sacrificial part and collides with the convex part 51, and the medium is substantially planarized (FIG. 7B). Then, the convex part 51 collides with the plasmon generator 16, but because the height of the convex part 51 becomes shorter, the impact force is small, and great stress and high temperature at the plasmon generator 16 do not occur (FIG. 7C).

In the present invention, it is the most preferable that the leading shield 11 protrudes more than the main pole 10 and the plasmon generator 16, but it is also effective when the leading shield 11, the main pole 10 and the plasmon generator 16 protrude equally, or even when the main pole 10 and the plasmon generator 16 protrude slightly more than the leading shield 11. As shown in examples, when the main pole 10 protrudes approximately 2 nm more than the leading shield 11, the effect of the present invention can be obtained.

It is believed that contamination that is adhered onto the magnetic recording medium 14 functions similarly to the asperity of the magnetic recording medium 14. Therefore, an effect of the contamination can be reduced by causing the leading shield 11 to protrude by utilizing the uncoupled light.

Figure 8:
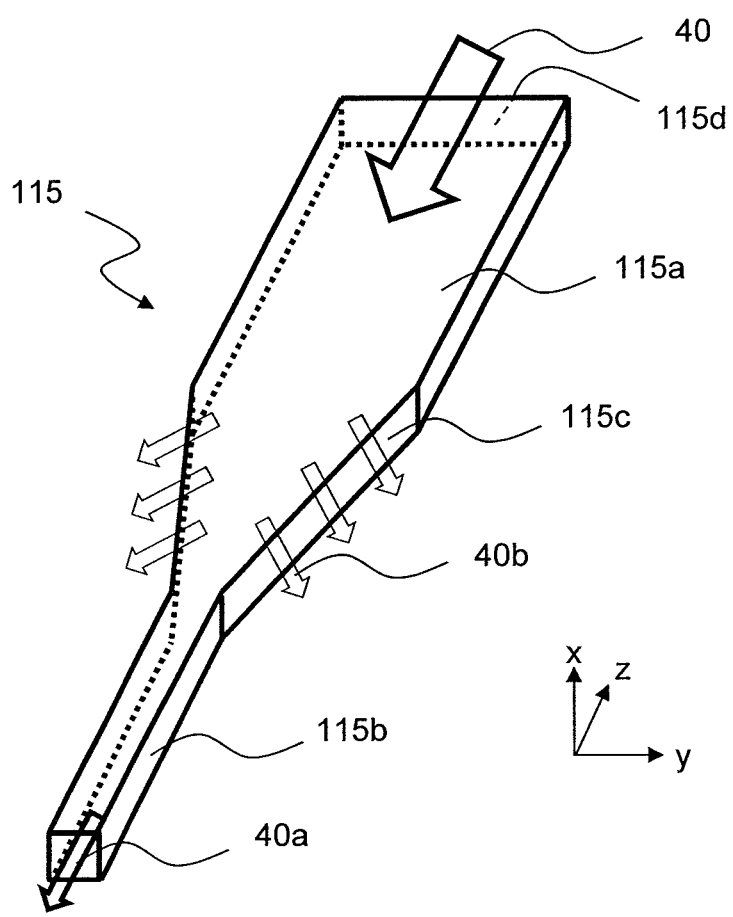
FIG. 8 is a perspective view of the core relating to another embodiment of the present invention.

The air bearing surface can be also thermally expanded using propagating light, which is coupled with the core 15 but not coupled with the plasmon generator 16. A core 115 shown in FIG. 8 has a first part 115*a* that includes an incident end surface 115*d* of laser light, and where its width in the cross track direction y is wider, a second part 115*b* that includes a part opposite to the plasmon generator 16, and where its width in the cross track direction y is narrower, and a third part 115*c* that links the first part 115*a* and the second part 115*b*, and where its width in the cross track direction y changes in the direction z that is orthogonal to the air bearing surface S. The third part 115*c* selectively propagates light 40*a* in a low-order mode that is required for generating NF light, and leaks light 40*b* in a high-order mode, which is not selected, from the third part 115*c* of the core 115. The light 40*b* in the high-order mode propagates through the cladding, and heats the leading shield 11. It is also possible to leak the light in high-order mode from the core not by changing a shape of the core but by changing a material of the core along the axis of the core in the z direction.

The TAMR head of the present embodiment can be created with the following steps.
(1) On a wafer (substrate 3), the lower-side shield layer 7 is formed by a plating method, the MR element 4 is formed by sputtering and the upper-shield layer 6 is formed by a plating method.
(2) The magnetic shield layer 8 is formed by the plating method.
(3) The leading shield 11 is formed by the plating method.
(4) The waveguide 17 made of a three-layer structure of the cladding 18/the core 15/the cladding 18 is formed by sputtering.
(5) The plasmon generator 16 is formed by sputtering.
(6) The main pole 10 is formed by the plating method.
(7) The overcoat layer 25 is formed by sputtering.
(8) Many magnetic head sliders 2 are created by cutting the wafer.
(9) The laser diode unit 31 is positioned relative to the core 15 so that laser light couples with the core 15, and the laser diode unit 31 is adhered to the magnetic head slider 2.

In Step (9), the laser diode unit 31 is adhered to the magnetic head slider 2 so that the emission center 32*m* of the laser diode 32 is shifted toward the leading side from the center of the core 15. When the laser diode unit 31 is adhered to the magnetic head slider 2, the position in the down track direction varies because of errors in the detecting of a target position and errors in the affixing of the laser diode unit 31. These errors are minute errors that occur with a standard deviation of approximately 0.1 to 1 μm, but they inevitably occur. Therefore, when the laser diode unit 31 is adhered to the magnetic head slider 2, it is necessary to consider these errors. For example, even if the laser diode unit 31 is adhered to the magnetic head slider 2 so that the emission center 32*m* of the laser diode 32 is shifted toward the leading side from the center of the core 15 by 0.3 μm, the offset of −0.3 μm cannot always be obtained. However, an offset within a desired range can be obtained by targeting the positional relationship between the laser diode unit 31 and the magnetic head slider 2 to obtain −0.3 μm of offset. Therefore, the laser diode unit 31 can be affixed to the magnetic head slider 2 by targeting to have a positional relationship where a portion of the laser light is coupled with the core 15, and the emission center 32*m* of the laser diode 32 is shifted toward the leading side in the down track direction from a position with the highest coupling efficiency to the core 15 by any desired offset distance.

EXAMPLE

In accordance with the steps above, a magnet slider was created. The down track-direction dimension 15d of the core 15 was 400 nm. In Step (9), the laser diode unit 31 was shifted in the down track direction by various distances, and was adhered to the magnetic head slider.

Figure 9:
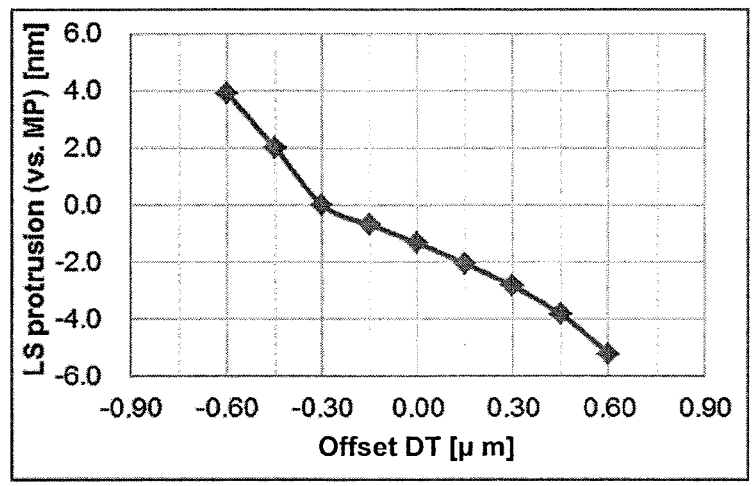
FIG. 9 is a graph showing the measured values of the protrusion amounts of the main pole and the leading shield.

A current was passed to the magnetic head slider that was created as described above, laser light was irradiated to the core 15 from the laser diode 32, and protrusion distances of the main pole 10 and the leading shield 11 in the direction z orthogonal to the air bearing surface were measured. The results are shown in FIG. 9. The horizontal axis indicates the offset DT in the down track direction, and the vertical axis indicates a protrusion distance of the leading shield 11 with respect to the main pole 10. When the offset is positive, it indicates that the main pole 10 protrudes more than the leading shield 11, and when the offset is negative, the leading shield 11 protrudes more than the main pole 10. It is assumed that this is because an uncoupled light that is not coupled with the core mainly exists on the leading shield 11 side when the offset is negative, the uncoupled light heats the leading shield 11 and the leading shield 11 protrudes more than the main pole 10. Inversely, it is assumed that this is because the uncoupled light exists mainly on the trailing side when the offset is positive, and a structure in the vicinity of the main pole 10 is heated, and the main pole 10 protrudes more than the leading shield 11. As described above, the shape of the air bearing surface that greatly affects a flying posture, and particularly distribution of the protrusion distance in the direction that is orthogonal to the air bearing surface, can be controlled by adjusting the offset.

Figure 10:
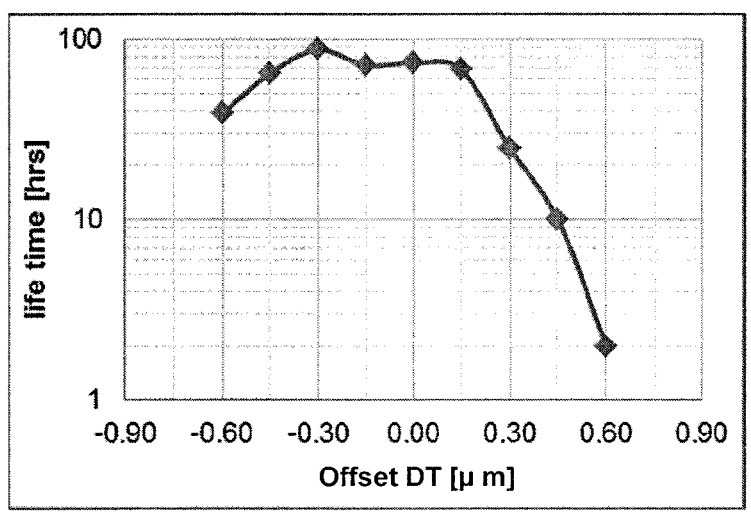
FIG. 10 is a graph showing the relationship between the offset of the laser diode and the longevity of the magnetic head.

Next, the longevity of the magnetic head created as described above was measured. The longevity is defined as a recorded time required for the S/N ratio of the recording pattern recorded in the magnetic recording medium 14 to be decreased by 2 dB. As shown in FIG. 10, when the offset is negative, i.e., when the leading shield 11 protrudes more than the main pole 10, it was ascertained that the longevity is increased.

Figure 11:
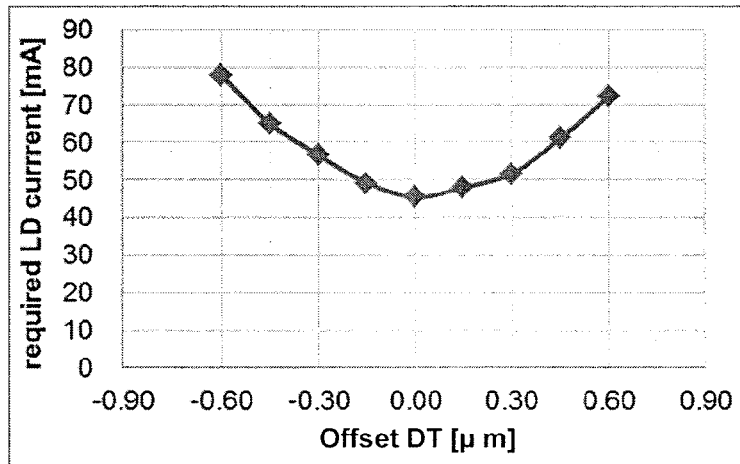
FIG. 11 is a graph showing the relationship between the offset of the laser diode and the necessary electric current of the laser diode.

In the meantime, as an absolute value of the offset increases, the coupling efficiency to the core of the laser light that is emitted from the laser diode unit decreases. Consequently, a supply current to the laser diode unit required for thermal assist recording increases. FIG. 11 shows a supply current to the laser diode required for heating the magnetic recording medium 14 to predetermined temperature as a function of the offset DT. When the offset is either positive or negative, when the offset is 0.6 μm or greater, a necessary electric current exceeds 70 mA, and is not preferable from a reliability standpoint of the laser diode unit itself.

According to the results above, in the system that was used as the example, it is preferable that the offset is within the range of −0.45 μm to +0.15 μm, and taking the variation upon the adhesion of the laser diode unit into consideration, the TAMR head with the highest reliability can be obtained by setting the offset of −0.15 μm as the center. As described above, since the down track-direction dimension 15d of the core 15 is 400 nm, it is desirable that the offset is distributed within a range of thickness 15d of the core 15 of ±75% setting the position shifted toward the leading side from the central axis 15c by the distance that is equivalent to 37.5% of the thickness 15d of the core 15 as the center. In other words, the offset is preferably distributed within the range of −112.5% to +37.5% of the thickness 15d of the core 15 with respect to the central axis 15c of the core 15. This range of the offset is equivalent to the case when the leading shield 11 protrudes to a level (±2 nm) equal to the main pole 10. Consequently, it is believed that the increased longevity as shown in FIG. 10 can be observed.

Next, a head gimbal assembly (HGA) where the thermal assisted magnetic recording head is mounted is explained.

Figure 12:
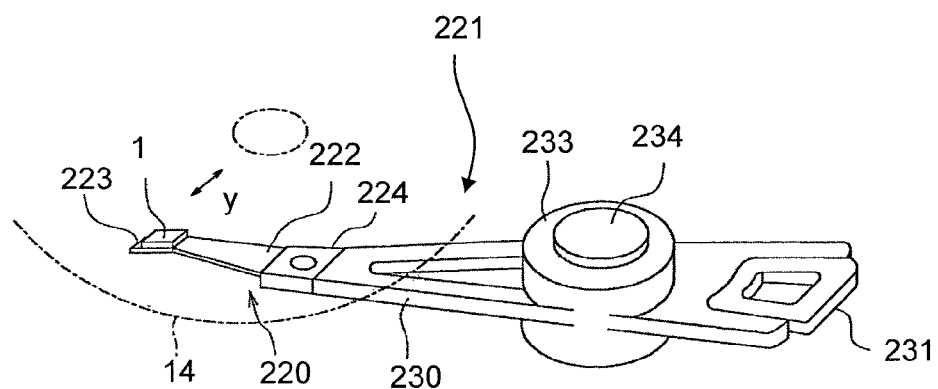
FIG. 12 is a perspective view of the head arm assembly of the present invention.

With reference to FIG. 12, a head gimbal assembly (HGA) 220 includes the thermal assisted magnetic recording head 1 and a suspension 221 that elastically supports the thermal assisted magnetic recording head 1. The suspension 221 has a plate spring-state load beam 22 formed with stainless steel, a flexure 223 provided at one end part of the load beam 222, and a base plate 224 provided at the other end part of the load beam 222. The thermal assisted magnetic recording head 1 is joined to the flexure 223, and provides an appropriate degree of freedom to the thermal assisted magnetic recording head 1. A gimbal part for keeping the position of the thermal assisted magnetic recording head 1 constant is provided at the portion where the thermal assisted magnetic recording head 1 is attached.

The assembly that the HGA 220 is mounted to an arm 230 is referred to as a head arm assembly 221. The arm 230 moves the thermal assisted magnetic recording head 1 in the cross track direction y of the magnetic recording medium 14. A base plate 224 is attached to one end of the arm 230. A coil 231, which is a part of a voice coil motor, is attached to the other end part of the arm 230. A bearing part 233 is provided in the intermediate part of the arm 230. The arm 230 is rotatably supported by a shaft 234 attached to the bearing part 233. The arm 230 and the voice coil motor that drives the arm 230 configure an actuator.

Figure 13:
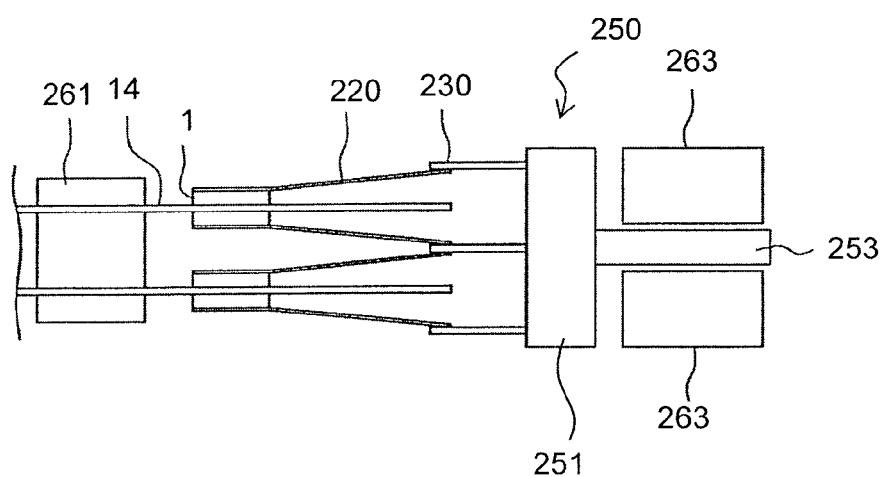
FIG. 13 is a side view of the head stack assembly of the present invention.
Figure 14:
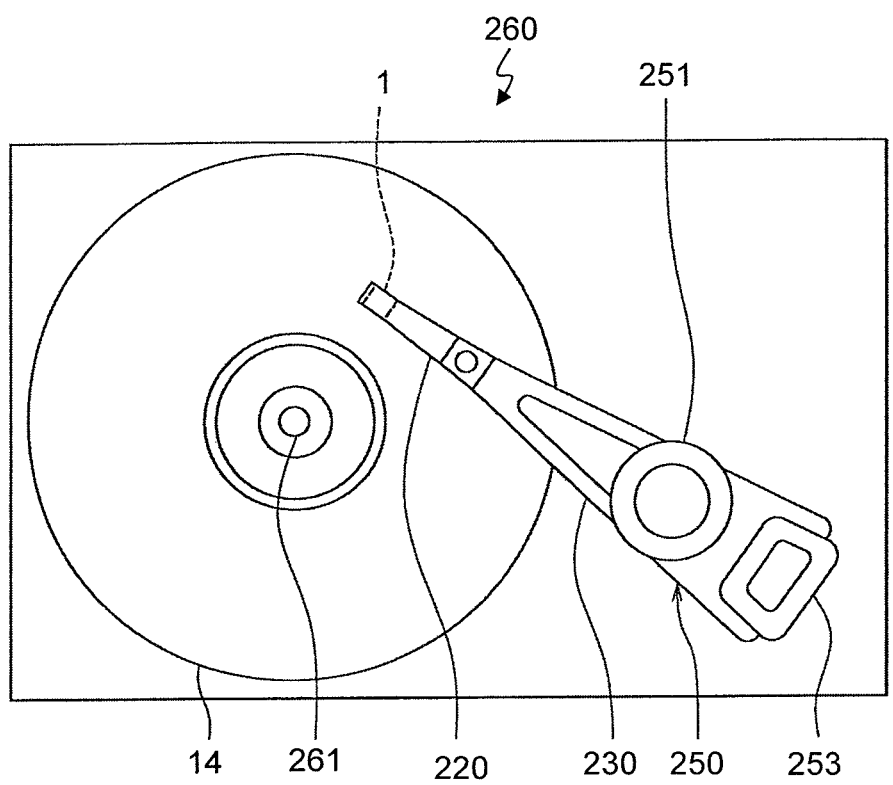
FIG. 14 is a plan view of the magnetic recording device of the present invention.

Next, with reference to FIG. 13 and FIG. 14, a head stack assembly in which the thermal assisted magnetic recording head 1 is incorporated and a magnetic recording device are explained. The head stack assembly is an assembly where the HGA 220 is attached to each arm of a carriage having a plurality of arms. FIG. 13 is a side view of the head stack assembly, and FIG. 14 is a plan view of the magnetic recording device. The head stack assembly 250 has a carriage 251 having a plurality of arms 230. The HGA 220 is attached to each arm 230 so as to be spaced from each other and arranged side-by-side in a perpendicular direction. A coil 253, which is a part of the voice coil motor, is attached to the opposite side of the arm 230 of the carriage 251. The voice coil motor has permanent magnets 263 arranged at opposite positions across the coil 253.

With reference to FIG. 13, the head stack assembly 250 is incorporated into a magnetic recording device 260. The magnetic recording device 260 has a plurality of the magnetic recording media 14 that are attached to a spindle motor 261. Two thermal assisted magnetic recording heads 1 are arranged to be opposite in every magnetic recording medium 14 across the magnetic recording medium 14. The head stack assembly 250 except for the thermal assisted magnetic recording heads 1 and the actuator correspond to a positioning device, support the thermal assisted magnetic recording heads 1, and, position the thermal assisted magnetic recording heads 1 with respect to the magnetic recording medium 14. The thermal assisted magnetic recording heads 1 are moved in the cross track direction of the magnetic recording medium 14 by the actuator, and are positioned with respect to the magnetic recording medium 14. The thermal assisted magnetic recording head 1 records information into the magnetic recording medium 14 by the magnetic recording element 5, and reproduces the information recorded in the magnetic recording medium 14 by the MR element 4.

Although the desired embodiments of the present invention were presented and explained in detail, as long as they do not depart from the effect or the scope of attached claims, readers should understand that various modifications and amendments are possible.

What is claimed is:

1. A thermal assisted magnetic recording head, comprising:
    a magnetic head slider, comprising:
        an air bearing surface opposite to a magnetic recording medium,
        a core that can propagate laser light as propagating light,
        a plasmon generator that includes a generator front end surface facing the air bearing surface, and
        a main pole facing the air bearing surface; and
    a laser light generator that supplies the laser light to the core, wherein
    the plasmon generator is opposite to a part of the core and extends to the generator front end surface, is coupled with a portion of the propagating light that propagates through the core in a surface plasmon mode and generates surface plasmon, propagates the surface plasmon to the generator front end surface, and generates near-field light (NF light) at the generator front end surface to heat the magnetic recording medium,
    the main pole includes a main pole end surface that faces the air bearing surface and that is positioned in the vicinity of the generator front end surface, and that emits magnetic flux to the magnetic recording medium from the main pole end surface, and
    at least a portion of the laser light that is not coupled with the plasmon generator thermally deforms the air bearing surface, so that a part of the air bearing surface, which is positioned closer to the leading side than the generator front end surface and the main pole end surface in a down track direction, protrudes toward the magnetic recording medium.

2. The thermal assisted magnetic recording head according to claim 1, wherein
    the part of the air bearing surface protrudes more toward the magnetic recording medium than the generator front end surface and the main pole end surface.

3. The thermal assisted magnetic recording head according to claim 1, wherein
    at least the portion of the laser light is the laser light that is not coupled with the core as the propagating light.

4. The thermal assisted magnetic recording head according to claim 1, wherein
    an emission center of the laser light generator is shifted toward the leading side in the down track direction from a position with the highest coupling efficiency to the core.

5. The thermal assisted magnetic recording head according to claim 4, wherein
    a position with the highest coupling efficiency to the core is on an extension of the central axis of the core.

6. The thermal assisted magnetic recording head according to claim 5, wherein
    an offset distance between the emission center of the laser light generator and the central axis of the core in the down track direction is within the range of 0 to 37.5% (excluding 0%) of the down track direction-dimension of the core.

7. The thermal assisted magnetic recording head according to claim 1, further comprising:
    a leading shield that includes a shield end surface that faces the air bearing surface, that is positioned closer to the leading side than the generator front end surface, that is magnetically coupled with the main pole, and that absorbs magnetic flux returning from the magnetic recording medium, wherein
    the part of the air bearing surface is the shield end surface.

8. The thermal assisted magnetic recording head according to claim 1, wherein
    at least the portion of the laser light is the propagating light that is coupled with the core, but is not coupled with the plasmon generator.

9. The thermal assisted magnetic recording head according to claim 8, wherein
    the core comprises:
        a first part that includes an incident end surface of the laser light;
        a second part that includes a part opposite to the plasmon generator, and where its width in the cross track direction is narrower than a width of the first part in the cross track direction; and
        a third part that links the first part and the second part, and where its width in the cross track direction changes in the direction that is orthogonal to the air bearing surface.

10. A head gimbal assembly, comprising:
    the thermal assisted magnetic recording head according to claim 1, and
    a suspension that elastically supports the thermal assisted magnetic recording head, wherein
    the suspension comprises:
        a flexure to which the thermal assisted magnetic recording head is joined,
        a load beam having one end connected to the flexure, and
        a base plate which is connected to the other end of the load beam.

11. A magnetic recording device, comprising:
    the magnetic recording medium that positions to be opposite to the thermal assisted magnetic recording head according to claim 1,
    a spindle motor that rotates and drives the magnetic recording medium, and
    a device that supports the magnetic head slider and that positions the magnetic head slider with respect to the magnetic recording medium.

12. A manufacturing method for a thermal assisted magnetic recording head, wherein
    the thermal assisted magnetic recording head comprises:
        a magnetic head slider, comprising:
            an air bearing surface opposite to a magnetic recording medium,
            a core that can propagate laser light as propagating light,
            a plasmon generator that includes a generator front end surface facing the air bearing surface, and
            a main pole facing the air bearing surface; and
        a laser light generator that supplies the laser light to the core, wherein
        the plasmon generator is opposite to a part of the core and extends to the generator front end surface, is coupled with a portion of the propagating light that propagates through the core in a surface plasmon mode and generates surface plasmon, propagates the surface plasmon to the generator front end surface, and generates near-field light at the generator front end surface to heat the magnetic recording medium, the main pole includes a main pole end surface that faces the air bearing surface and is positioned in the vicinity of the generator front end surface, and emits a magnetic flux to the magnetic recording medium from the main pole end surface; and the manufacturing method including:
  targeting a predetermined positional relationship between the laser light generator and the magnetic head slider;
  affixing the laser diode unit including the laser light generator to the magnetic head slider; and
  in the positional relationship, coupling a portion of the laser light with the core, and
  shifting an emission center of the laser light generator toward the leading side in the down track direction from a position with the highest coupling efficiency with the core.

* * * * *